W. A. TURBAYNE.
CONVERTER.
APPLICATION FILED APR. 12, 1915.
1,326,227.  Patented Dec. 30, 1919.
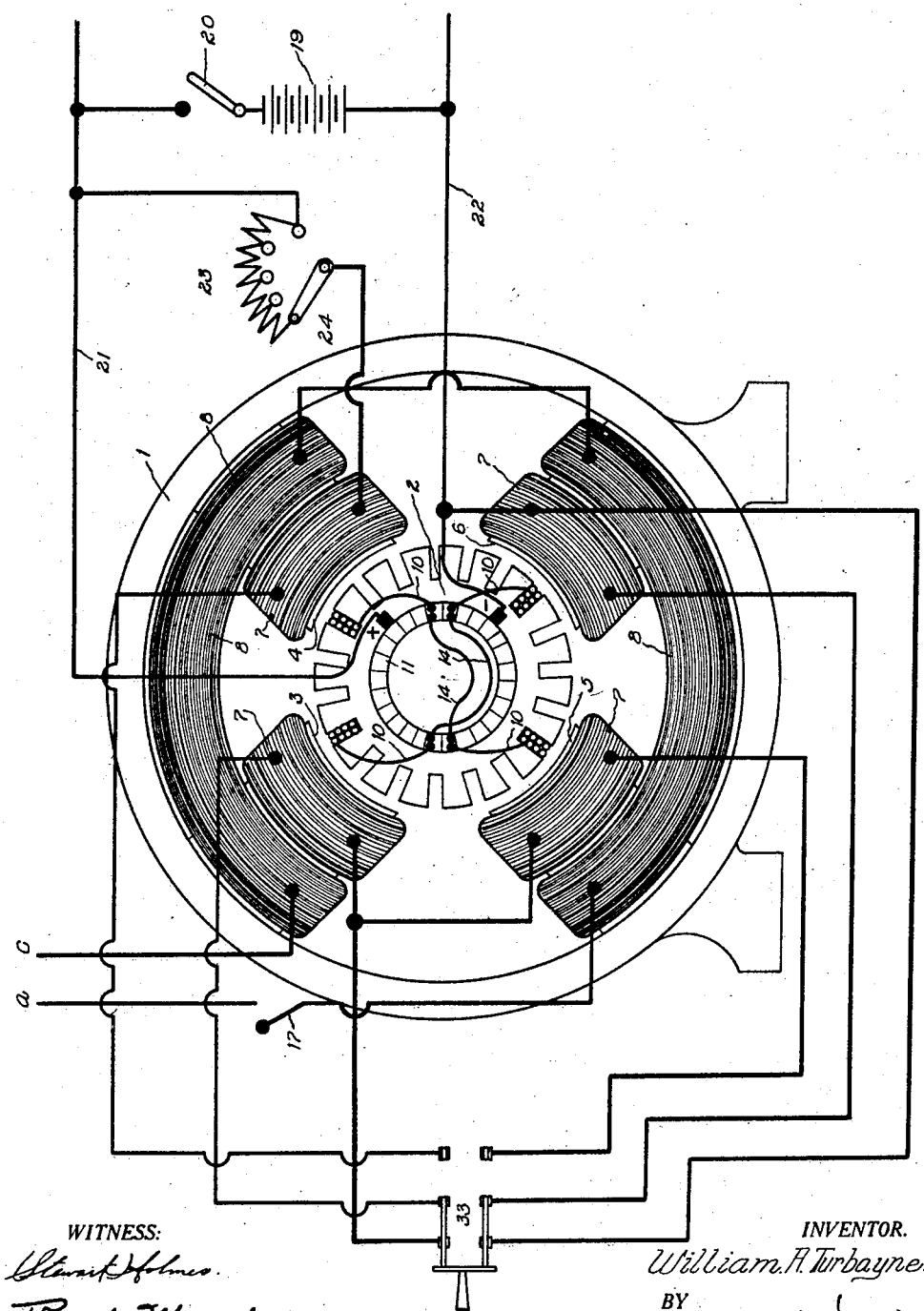
WITNESS:
INVENTOR.
William A. Turbayne.
BY
ATTORNEY.

UNITED STATES PATENT OFFICE.

WILLIAM A. TURBAYNE, OF NIAGARA FALLS, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

CONVERTER.

1,326,227.     Specification of Letters Patent.     Patented Dec. 30, 1919.

Application filed April 12, 1915. Serial No. 20,796.

*To all whom it may concern:*

Be it known that I, WILLIAM A. TURBAYNE, a citizen of the United States, residing at Niagara Falls, in the county of Niagara and State of New York, have invented new and useful Improvements in Converters, of which the following is a specification.

This invention relates to converters.

Alternating current has been transformed or converted into direct current by means of dynamo-electric machines, such as motor-generators and converters. A motor generator has an alternating current motor and a direct current generator, the armatures of which are mechanically connected so that the generator is driven by the motor. Alternating current is supplied to the motor which then drives the generator and causes it to produce direct current.

A motor-generator requires two dynamo-electric machines while a converter is simply a single dynamo-electric machine which has one armature and one field magnet.

A converter has its field magnet energized by a direct current winding and its field flux is unidirectional and constant. The armature winding is connected to slip rings and to a commutator. Alternating current is supplied to the armature winding through the slip rings, thus causing the converter to operate as a synchronous motor, and direct current is taken from the armature winding through the commutator.

A motor-generator and a converter each have advantages and limitations. The direct current voltage developed by a motor-generator may be varied or reversed at will, independent of the alternating current voltage. This cannot be accomplished with a converter in which the direct and alternating current voltages and polarities must always bear a substantially fixed relation. A motor-generator must consist of two machines instead of one, as a converter and the motor must have sufficient capacity to carry in addition to the generator load the losses in both machines.

The alternating current voltage which corresponds to the required direct current voltage in a converter is ordinarily much lower than is obtainable directly from the commercial source of supply and hence a transformer must be employed in such cases to reduce the commercial alternating current voltage so that it is suitable for the converter.

Among the objects of the present invention are to provide means in a converter whereby the ratio between the AC voltage and DC voltage may be varied at will; whereby the DC voltage may be reversed at will; and whereby the converter may be conveniently started.

While this converter will be set forth as transforming an alternating current into direct current, it likewise may transform direct current into alternating current. Also, while it is performing either function, mechanical power may be taken therefrom or applied thereto.

According to this invention as it is ordinarily practised, the converter is provided with a field magnet or stator, an armature or rotor, and a commutator. The field magnet is energized by both alternating and direct current windings in such manner that a field of substantially constant magnitude is produced, this field being the result of two components, one produced by alternating current and the other by direct current.

In order to facilitate explanation, the field is treated herein as composed of an alternating flux and a unidirectional or direct flux which are superimposed.

The one figure of the drawing is a diagrammatic view of one embodiment of the present invention.

The converter has a field magnet 1 and an armature 2. The field magnet has four direct current poles 3, 4, 5 and 6 and two alternating current poles 3—4 and 5—6, so that, as a direct current magnet, it has four poles, while as an alternating current magnet it has two poles. For the purpose of producing the polarities referred to, windings 7, 7 may be placed on each of the poles 3, 4, 5 and 6, said coils being wound to make adjacent poles of opposite polarities. Windings 8, 8, which may be connected across an alternating current supply, are mounted so that each embraces two poles. One of said windings 8, 8 embraces poles 3—4 while the other embraces poles 5—6 whereby to tend to produce the result that poles 3—4 will have one instantaneous polarity while poles 5—6 will, at the same instant, have the opposite polarity. The same result may, of course, be accomplished by dividing each of the coils 8, 8, mounting a coil on each of the poles 3, 4, 5 and 6. Of course, the number of poles may be varied according to the circumstances. Ordinarily, the number of direct current poles will be divisible by four or the number of pairs of direct current poles will be even, and they will be double the number of alternating current poles.

Consecutive poles have the alternating current windings so wound in relation to the direct current windings that the alternating current ampere turns are added to the direct current ampere turns of one pole and subtracted from the direct current ampere turns of the other pole and the electromotive force induced by the alternating current winding in one direct current winding is in opposition to that induced in the other direct current winding.

To illustrate more particularly, consider poles 3—4 and their alternating and direct current windings at a given instant. The alternating current ampere turns are added to the direct current ampere turns of the pole 3 and subtracted from the direct current ampere turns of the pole 4, and the electromotive force induced by the alternating current winding in one direct current winding is in opposition to that induced in the other direct current winding. Similar results will be found at any other pair of consecutive poles.

Inasmuch as the same number of alternating current ampere turns are subtracted as are added and the electro-motive forces induced in the direct current windings by the alternating current windings counteract each other, the direct current flux has substantially constant magnitude.

The drawing illustrates schematically the way in which the same armature windings or the same armature coils may be used for both alternating current and direct current. The armature conductors are connected by end connectors 10 to segments of the commutator 11 and connectors 14 connect the commutator segments. Merely two connectors are shown in each instance to avoid confusion, but it will be understood that similar connections are made throughout the winding and the commutator.

The armature winding is thus cross-connected through the connectors 10 and 14 at points of maximum difference of potential in regard to the alternating field flux and at points of equal potential in regard to the unidirectional field flux. The connectors 14, in addition to the purpose already stated, also serve as equalizer connectors between the commutator bars, so that merely two brushes need to be employed instead of four.

The winding represented is a drum winding and, preferably, is given one hundred and twenty degrees (120°) pitch. Merely two coils are illustrated, but, of course, as many similar coils are provided as the armature may require. Each coil is connected to two commutator bars and opposite commutator bars are connected by cross connectors 14. The two coils are so connected by the cross connectors, as shown, that they provide a local or closed circuit in which the alternating current induced by the alternating field may circulate.

Direct current is obtained from the two brushes.

The cross connectors, in addition to connecting the coils as stated, so connect the commutator bars that two brushes are sufficient instead of four. They serve the purpose of ordinary equalizing connections.

The direction of current flow in the various armature conductors and through the cross connectors need not be explained herein. The direct current voltage is the resultant of the direct and alternating current voltages throughout the armature winding and inasmuch as the field flux has substantially constant magnitude, substantially constant direct current voltage is obtained at the brushes.

Various armature windings may be adopted in which current may circulate locally and also be delivered to the commutator brushes.

A switch 20 is provided to connect and disconnect the battery 19 from the converter. Current is delivered from the positive brush through the conductor 21, switch 20, battery 19 and conductor 22, to the negative brush. The direct current field windings 7 are connected in series across the conductors 21 and 22 and a field regulator, having a resistance 23 and an arm 24, is arranged in series therewith. The strength of the direct current field windings may be varied by adjusting the amount of resistance introduced into the direct current field circuit by the regulator. Thus the direct current voltage may be regulated to suit the conditions.

When the machine is in operation, direct current produced thereby will energize the direct current field winding 7.

The converter may be set in operation in various ways. It may be started by closing the switch 20 thereby sending current from the battery to the armature through the direct current brushes and also to the direct current field windings. It will then start as a direct current motor. When the armature is in rotation the alternating current switch 17 may be closed and then the alternating current will cause the machine to operate the same as an induction motor.

In the ordinary synchronous converter, the applied alternating voltage and the direct voltage have a substantially fixed ratio. The result is that where the voltage of the alternating current supply is greater than that corresponding to the required direct current voltage, a transformer must be employed to produce the proper alternating current voltage.

There is no fixed ratio existing between the applied alternating current voltage and the delivered direct current voltage in the improved converter herein described. The alternating current stator winding is electrically dis-associated from the direct current winding and hence may be provided with the number of turns appropriate for the alternating current supply voltage, and similarly, the rotor winding, from which the direct current is obtained, may be furnished with the number of active conductors suited to the voltage desired. With this improved converter therefore, the static transformer ordinarily employed is unnecessary.

The converter may be started from the alternating current source in various ways, and one way in which this may be accomplished is illustrated in the drawing. The alternating current windings 8 are connected to the alternating current supply as before. A double throw switch 33 is provided which, when thrown to the left, short-circuits two diametrically opposite direct current field coils and open-circuits the other two direct current field coils and when thrown to the right connects the direct current field coils in series. The short-circuited direct current coils cause a magnetic phase displacement in the bi-polar alternating current field and this results in a revolving field which produces rotation of the armature. When the armature is in rotation, the switch is thrown to the right to connect the direct current coils in series.

The particular structures and windings herein set forth have been selected merely for the purpose of illustration. A field having the required characteristics may be created in various ways, and the armature may be provided with various means which will respond to the field to produce the armature rotation and generate the direct current. The stator may have salient poles as illustrated, or may have a distributed field winding. The distributed winding will be preferred in practice to the winding illustrated. The illustrated winding has been shown for the sake of simplicity.

In the foregoing description and drawings, only single phase alternating current is indicated in producing the alternating current flux, but polyphase alternating currents may be employed for the same purpose, in which event the machine will start from rest and rotate without necessitating the employment of special starting provisions.

Having thus described my invention, what I claim as new and desire to secure by Letters Patent of the United States is:—

1. A dynamo-electric machine having two relatively rotatable members, one of which comprises a single magnetic structure provided with a winding adapted for connection to an AC source and a second winding adapted for connection to a DC source, said second winding being in sections, one of which is circumferentially unsymmetrically placed relative to said first mentioned winding, and means for short circuiting said section to produce a magnetic phase displacement.

2. A dynamo-electric machine having two relatively rotatable members, one of which comprises a single magnetic structure provided with a winding adapted for connection to an AC source and a second winding adapted for connection to a DC source, said second winding comprising a plurality of circumferentially spaced sections, which sections are individually circumferentially unsymmetrically arranged relative to said first winding, and means for short circuiting certain of said sections and open circuiting the remainder of said sections to produce a magnetic phase displacement.

3. A dynamo-electric machine having two relatively rotatable members, one of which comprises a single magnetic structure provided with a winding adapted for connection to an AC source and a second winding adapted for connection to a DC source, said second winding comprising a plurality of circumferentially spaced sections, which sections are individually circumferentially unsymmetrically arranged relative to said first winding, and means whereby certain of said sections may act as damper means for starting purposes.

In witness whereof, I have hereunto subscribed my name.

WILLIAM A. TURBAYNE.